(12) United States Patent
Yang et al.

(10) Patent No.: US 10,013,189 B1
(45) Date of Patent: Jul. 3, 2018

(54) STORAGE VOLUME BACKUP MANAGEMENT FOR MULTI-TENANT ENVIRONMENTS

(71) Applicant: EMC Corporation, Hopkinton, MA (US)

(72) Inventors: Xing Yang, Weston, MA (US); Kenneth Durazzo, San Ramon, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 213 days.

(21) Appl. No.: 14/967,555

(22) Filed: Dec. 14, 2015

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0665* (2013.01)

(58) Field of Classification Search
CPC ........ G06F 3/067; G06F 3/061; G06F 3/0647; G06F 3/064; G06F 3/0605; G06F 3/0611; G06F 3/0617; G06F 3/0631; G06F 3/065; G06F 3/0665; G06F 3/0689; G06F 3/0619
See application file for complete search history.

(56) References Cited

U.S. PATENT DOCUMENTS

| | | | |
|---|---|---|---|
| 9,405,756 B1* | 8/2016 | Xavier | G06F 17/30088 |
| 9,424,137 B1* | 8/2016 | Mam | G06F 11/1451 |
| 2004/0010732 A1* | 1/2004 | Oka | G06F 11/1456 |
| | | | 714/13 |
| 2007/0283119 A1* | 12/2007 | Sarkar | G06F 3/0605 |
| | | | 711/170 |
| 2012/0331225 A1* | 12/2012 | Jones | G06F 3/0605 |
| | | | 711/114 |
| 2014/0173694 A1* | 6/2014 | Kranz | G06F 21/606 |
| | | | 726/4 |
| 2014/0330869 A1* | 11/2014 | Factor | G06F 21/6218 |
| | | | 707/783 |
| 2016/0110258 A1* | 4/2016 | Haustein | G06F 11/1451 |
| | | | 714/19 |

OTHER PUBLICATIONS

Wikipedia, "Open Stack," https://en.wikipedia.org/w/index.php?title=OpenStack&printable=yes, Dec. 4, 2015, 14 pages.
Openstack Storage, "OpenStack Storage: Cinder and Swift Explained," http://www.computerweekly.com/feature/OpenStack-storage-Cinder-and-Swift-explained, Dec. 9, 2015, 7 pages.

* cited by examiner

*Primary Examiner* — Hiep Nguyen
(74) *Attorney, Agent, or Firm* — Ryan, Mason & Lewis, LLP (57) ABSTRACT

An apparatus comprises at least one host device for hosting respective tenants of a multi-tenant environment. The apparatus further comprises a storage platform coupled to the host device and implementing storage resources for utilization by respective tenants, and a storage controller associated with the host device comprising a storage volume creation functionality and a storage volume backup functionality. The storage volume creation functionality is configured to provision portions of the storage resources to create at least one storage volume. The storage volume backup functionality is configured to provision portions of the storage resources for performing one or more respective storage volume backup or restore processes, wherein a container is respectively provisioned for each storage volume backup or restore process.

20 Claims, 4 Drawing Sheets

STORAGE VOLUME BACKUP MANAGEMENT FOR MULTI-TENANT ENVIRONMENTS

FIELD

The field relates generally to information processing systems, and more particularly to storage volume backup management in multi-tenant environments.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Alternative virtual resources now coming into use in information processing systems include Linux containers. Such containers may be used to provide at least a portion of the virtualization infrastructure of a given information processing system. However, significant challenges arise in deployment of containers in multi-tenant environments. For example, backing up storage volumes associated with containers, i.e., storing copies of the storage volumes separate from the originals, poses challenges in multi-tenant environments.

SUMMARY

Illustrative embodiments provide techniques for storage volume backup management in multi-tenant environments. For example, in one embodiment, an apparatus comprises at least one host device for hosting respective tenants of a multi-tenant environment. The apparatus further comprises a storage platform coupled to the host device and implementing storage resources for utilization by respective tenants, and a storage controller associated with the host device comprising a storage volume creation functionality and a storage volume backup functionality. The storage volume creation functionality is configured to provision portions of the storage resources to create at least one storage volume. The storage volume backup functionality is configured to provision portions of the storage resources for performing one or more respective storage volume backup or restore processes, wherein a container is respectively provisioned for each storage volume backup or restore process.

The storage volume creation functionality may be implemented on a separate node from the storage volume backup functionality. Advantageously, the storage volume backup functionality is decoupled from the storage volume creation functionality improving backup efficiency.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as multi-tenant environments.

Figure 1:
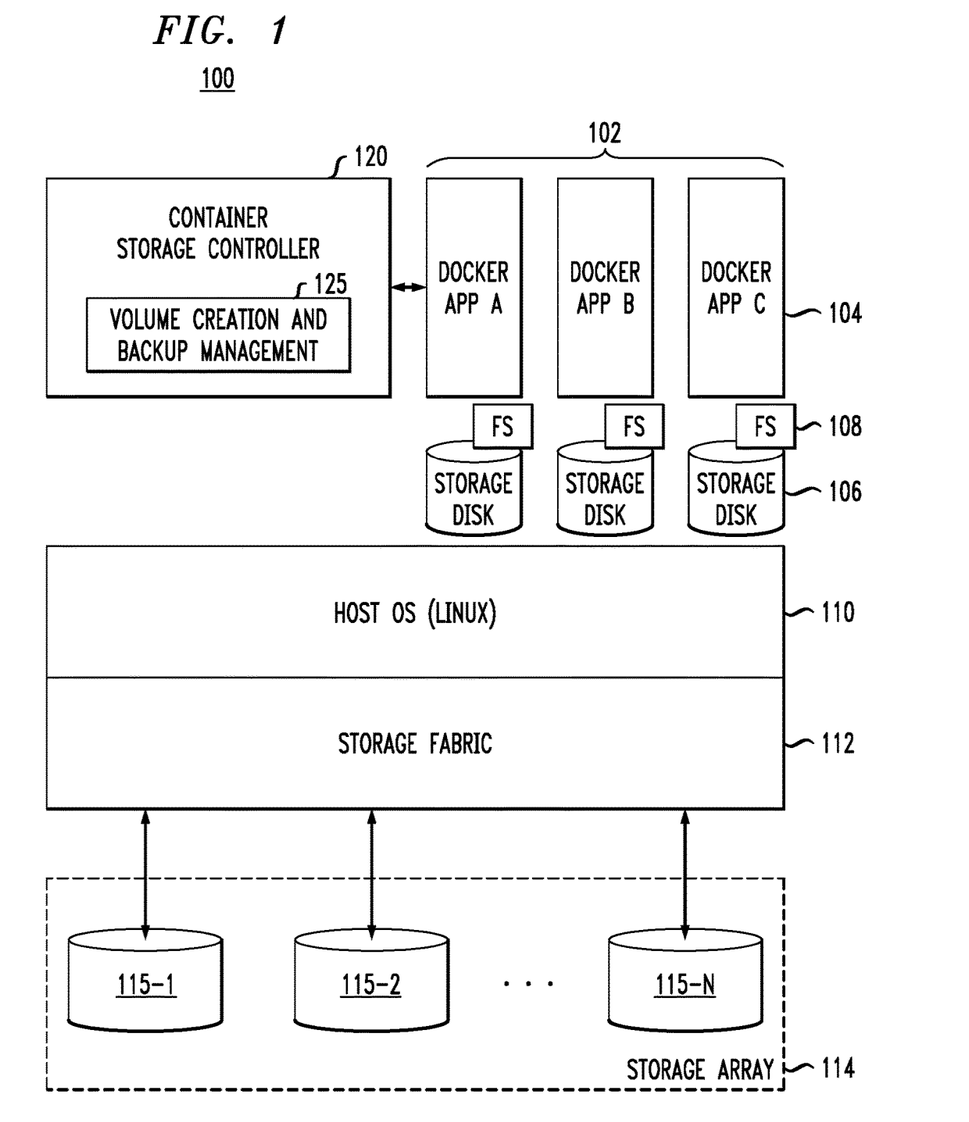
FIG. 1 shows an information processing system configured to provide backup management for storage volumes of a multi-tenant environment in an illustrative embodiment.

FIG. 1 shows an information processing system 100 configured in accordance with an illustrative embodiment. The system 100 comprises a plurality of containers 102 that are assumed to be implemented by at least one container host device. Each of the containers 102 comprises a corresponding application 104 that runs in that container, a storage disk 106, and an associated file system (FS) 108. The storage disks 106 are examples of what are more generally referred to herein as "storage volumes." The storage disks in some embodiments may comprise respective virtual disks. A wide variety of other types of physical or virtual storage volumes may be used in other embodiments.

The containers 102 are assumed to be associated with respective tenants of a multi-tenant environment of the system 100, although in other embodiments a given tenant can have multiple containers. It will also be assumed for further description below that a single container host device implements all of the containers 102 of the FIG. 1 embodiment, although other embodiments can include multiple container host devices. Each of these container host devices illustratively comprises at least one processor coupled to a memory. Such host devices are examples of what are more generally referred to herein as "processing devices."

The containers 102 of the system 100 are illustratively implemented as respective Docker containers, but one or more of the containers in other embodiments can comprise other types of containers, such as other types of Linux containers (LXCs). It is therefore to be appreciated that embodiments of the present invention are not restricted to use with Docker containers or any other particular type of containers. The containers 102 are assumed to be implemented on the above-noted container host device using Linux kernel control groups ("cgroups").

The containers 102 may be utilized to implement a variety of different types of functionality within the system 100. For example, such containers can be used to implement platform-as-a-service (PaaS) or infrastructure-as-a-service (IaaS) functionality in system 100, as well as microservices or converged infrastructure within a data center or other cloud computing and storage system. More particularly, in the present embodiment, the containers 102 comprise respective Docker containers running respective Docker applications denoted A, B and C, with each such container and its associated application corresponding to a different tenant of the multi-tenant environment of system 100.

The tenants associated with the respective containers 102 in the FIG. 1 embodiment are also referred to herein as tenants A, B and C. Accordingly, Docker application A is run in a container of tenant A, Docker application B is run in a container of tenant B, and Docker application C is run in a container of tenant C.

In other embodiments, processes other than applications 104 can be run in the containers 102. By way of example, containers can be used to implement respective portions of one or more cloud compute nodes of a cloud computing system. Such compute nodes may be associated with respective cloud tenants.

The container host device that implements the containers 102 in the FIG. 1 embodiment has a host operating system (OS) 110 that illustratively comprises a Linux operating system. The container host device is coupled to a storage platform that implements storage resources for utilization by the containers 102. The storage platform in this embodiment comprises a storage fabric 112 coupled to a storage array 114. The storage array 114 comprises a plurality of storage volumes denoted 115-1, 115-2, . . . 115-N. Other embodiments can implement other types of storage platforms, such as storage platforms comprising only a storage array, or storage platforms that use a storage fabric without a storage array. As noted above, storage resources of the storage platform comprising storage fabric 112 and storage array 114 are utilized by the containers 102 of the respective tenants A, B and C.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage products such as VNX® and Symmetrix VMAX®, both commercially available from EMC Corporation of Hopkinton, Mass. Other types of storage products that can be used in implementing a given storage platform in an embodiment of the present invention include SDS products such as ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation.

The system 100 further comprises a container storage controller 120. In the present embodiment, at least a portion of the container storage controller 120 is assumed to be running as an application on the same container host device that implements the containers 102 for the respective tenants. By way of example, the container storage controller may run at least in part in its own container on the container host device, separate from the containers 102, although it need not run in a container.

The container storage controller 120 is configured to provision portions of the storage resources of the storage platform for respective ones of the containers 102. The provisioned portions of the storage resources of the storage platform include for each of the containers 102 at least one storage volume. The storage disks 106 are illustrative examples of storage volumes provisioned for respective ones of the containers 102, although other types of storage volumes, including physical or virtual storage volumes, or combinations thereof, can be provisioned for one or more of the containers 102 in other embodiments.

In illustrative embodiments, the information processing system 100 implements an open-source software platform for cloud computing known as OpenStack® (OpenStack Foundation). The software platform comprises a plurality of interrelated software components that control hardware pools of computing, storage, and networking resources that are part of the information processing system 100.

One such component, known as "Cinder," is a block storage service that virtualizes pools of block storage devices and provides tenants (clients) with a self-service application programming interface (API) to request and consume those resources without requiring any knowledge of where their storage is actually deployed or on what type of device. The API is an OpenStack® native representational state transfer (REST) API. In addition to creating block storage volumes via a volume manager, Cinder also manages backup and restoration of storage volumes.

In the present embodiment, it is assumed that the container storage controller 120 implements, inter alia, the Cinder component whereby storage volume creation and backup management 125 is a portion of the controller 120 that manages the storage volume creation and backup functionalities of Cinder. As mentioned above, Cinder and OpenStack® are respective examples of software components and platforms that the information processing system 100 may implement. However, alternative embodiments of the invention are not limited to such components or platforms.

Figure 2:
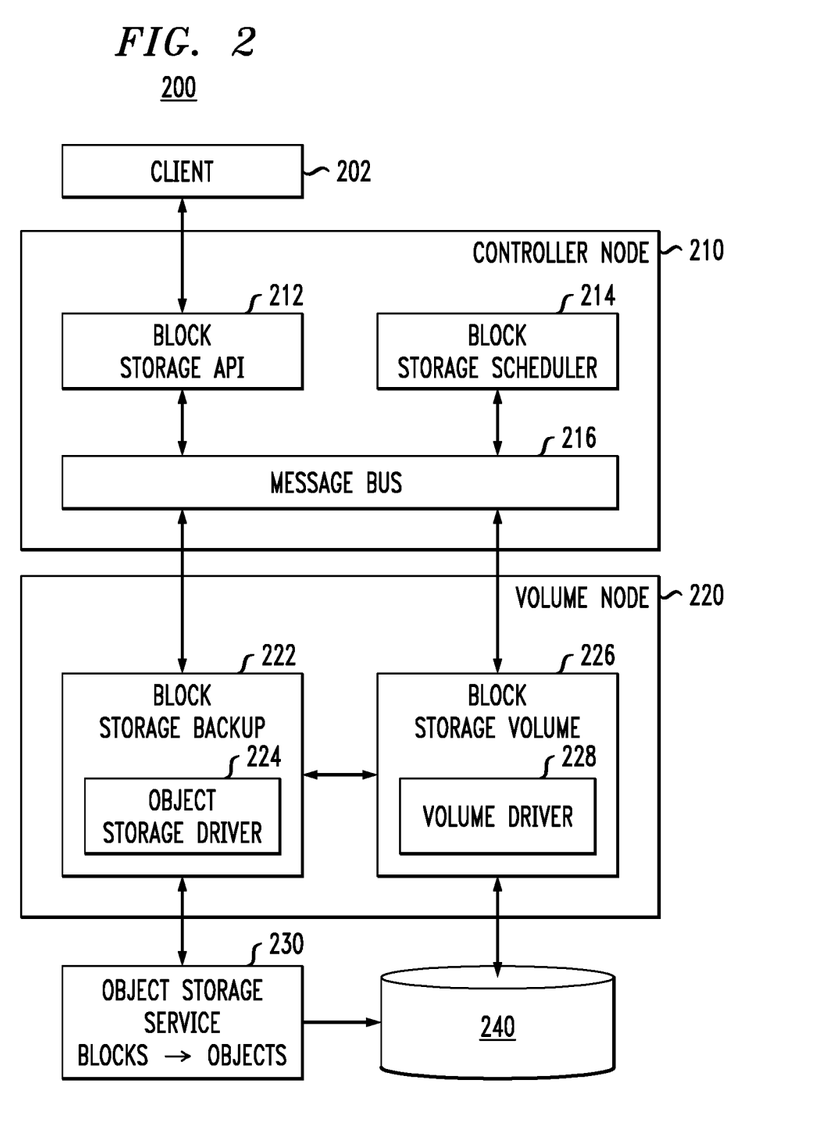
FIG. 2 shows an illustrative storage volume creation and backup architecture utilized in a multi-tenant environment.

FIG. 2 illustrates an example of storage volume creation and backup management functionalities and components in a typical Cinder scenario. It is to be understood that components shown in FIG. 2 can be implemented as part of a container storage controller on one or more container host devices. Note that FIG. 2 generally refers to Cinder as "block storage" or "block storage service" (since, as mentioned above, alternative embodiments may implement other block storage management software). As shown in storage volume creation and backup management environment 200 in FIG. 2, a client 202 interacts with a controller node 210 through a REST API component 212. The controller node 210 also comprises a scheduler component 214 and a message bus 216. The API 212 provides access to the system components for the client, while the scheduler 214 provides scheduling operations for the Cinder functions. A volume node 220 comprises a block storage backup component 222 with an object storage driver 224, and a block storage volume creation component 226 with a volume driver 228. The components of the volume node 220 communicate with the components of the controller node 210 via the message bus 216. Note also that while one volume node is shown in FIG. 2 for simplicity of explanation, the system could have a plurality of volume nodes.

In the typical Cinder scenario shown in FIG. 2, the volume driver 228 of block storage volume creation component 226 creates a storage volume 240 in a storage backend of the system (e.g., storage disk 106 created as a storage volume 115 in (backend) storage array 114 in FIG. 1). In addition, a backup (i.e., separate copy) of the storage volume is created by block storage component 222. The backup is also stored in the storage backend. However, rather than storing the storage volume backup as one or more storage blocks, in this illustrative embodiment, the storage volume backup is stored as one or more storage objects. Thus, object storage driver 224 communicates with an object storage service 230 at the storage backend. In the OpenStack® embodiment, a software component known as "Swift" provides object storage management. Thus, in the present embodiment, object storage service 230 can be implemented as Swift whereby storage volumes are stored as objects. While Swift is used as the backup backend in this illustrative embodiment, Cinder backup also supports other backup options such as, but not limited to, Network File System (NFS), Ceph (Inktank Storage Inc.), and GlusterFS (Red Hat Inc.). Cinder can also be configured to support data protection components such as Avamar® or DD Boost™ (commercially available from EMC Corporation) with appropriate backup drivers.

As shown in this typical Cinder scenario of FIG. 2, note that both the Cinder volume service (block storage volume creation component 226) and the Cinder backup service (block storage backup component 222) are implemented on the same node (volume node 220). The term "node" as illustratively used herein with respect to the OpenStack® platform can be one or more processing devices (e.g., servers, blades, etc.) that are designated for implementing particular functions (i.e., controller node, volume node, compute node, etc.).

When client 202 submits a backup or restore request, the client first reaches the Cinder API 212 on the controller node 210. Cinder API 212 sends the request to the appropriate volume node 220 through the message bus 216. Cinder backup component 222 is also running on the same node 220 as the Cinder volume creation component 226. The Cinder backup component 222 then uses the volume driver 228 to make the volume accessible (obtain a copy) and back it up to Swift storage service 230. However, if there are multiple requests coming in for backing up and restoring volumes, the requests will be queued and can only be handled by the backup component 222 one after the other, i.e., in serial or sequential order. Because, in the FIG. 2 implementation, the backup request is always sent to the volume node 220 where the source volume is managed, the handling of multiple requests for backing up the same volume cannot scale. Furthermore, since only one backup process (component 222) is handling all backup requests, there is no tenant isolation.

Figure 3:
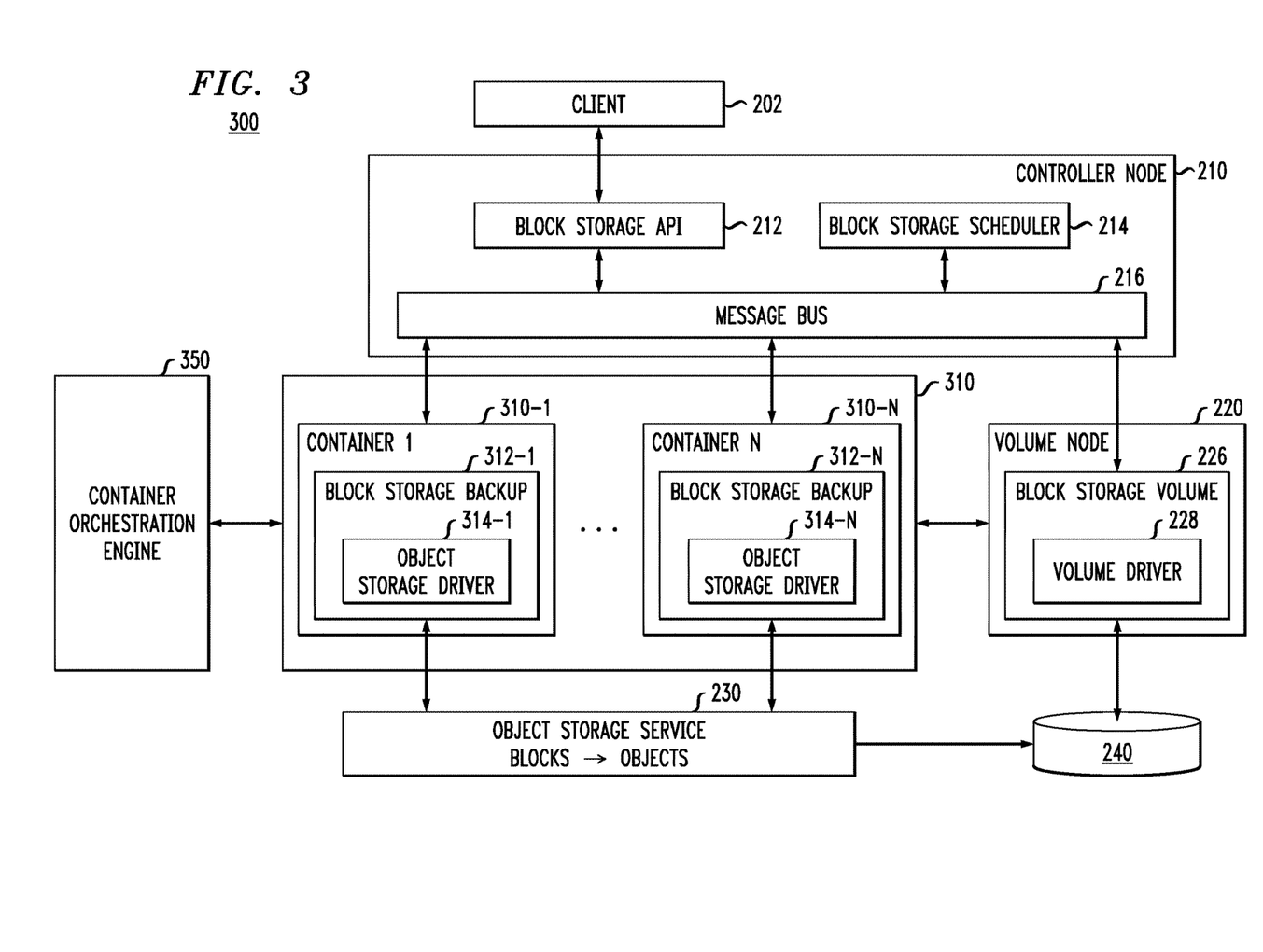
FIG. 3 shows a storage volume creation and backup architecture utilized in a multi-tenant environment in an illustrative embodiment.

FIG. 3 shows a storage volume creation and backup architecture utilized in a multi-tenant environment in an illustrative embodiment that overcomes the above and other drawbacks. As will be explained in detail below, while the block storage API and the scheduler components are still implemented on the controller node, the storage volume backup component is decoupled from the volume creation component (i.e., decoupled from the volume node), such that each backup request is run by its own separate backup component implemented within a separate container. Advantageously, this architecture alleviates the bottleneck condition associated with all backup requests being handled by one backup component, as in FIG. 2. Using a container to run a backup process allows scaling and handling of multiple backup and restore requests at the same time. This improves backup performance. Furthermore, multiple requests for backing up the same volume are handled by different containers. This helps scale the backup service. Still further, a container provides tenant isolation so one backup manager in one container is not aware of the job being done by another backup manager in another container. One container can therefore be consumed by one tenant and not by others. FIG. 3 illustrates these and other advantages. Note that the same reference numerals from FIG. 2 are used in FIG. 3 for components that perform the same or substantially similar function. Also, it is to be understood that components shown in FIG. 3 can be implemented as part of a container storage controller on one or more container host devices.

Accordingly, as shown in storage volume creation and backup management environment 300 in FIG. 3, a client 202 interacts with a controller node 210 through a REST API component 212. The controller node 210 also comprises a scheduler component 214 and a message bus 216. A volume node 220 comprises a block storage volume creation component 226 with a volume driver 228. Further, as noted above, the block storage backup functionality is now decoupled from the volume node 220 and implemented in a plurality of containers 310 (310-1, . . . , 310-N). Each container comprises a block storage backup component 312 (e.g., one of 312-1, . . . , 312-N) with an object storage driver 314 (e.g., one of 314-1, . . . , 314-N). Each block storage backup component and object storage driver perform the same functions as described above in the context of FIG. 2 but now, advantageously, in parallel for each backup (or restore) request received. The components of the containers 310 and the volume node 220 communicate with the components of the controller node 210 via the message bus 216. Note also that while one volume node is shown in FIG. 3 for simplicity of explanation, the system could have a plurality of volume nodes. The plurality of containers 310 are created (provisioned) and managed by container orchestration engine 350 as will be further explained below.

It is to be appreciated that, in alternative embodiments, more than one container 310 can be provisioned for a given backup (restore) request, and/or more than one backup (restore) request could be handled by a given container 310. In the latter case, any latency caused by one container handling multiple requests is isolated to that particular container and does not cause a bottleneck with any other requests.

In the present embodiment, the container orchestration engine 350 implements an OpenStack® component known as "Magnum." Magnum provides a multi-tenant Containers-as-a-Service functionality that uses a component known as "Heat" to orchestrate an operating system (OS) image. More specifically, Magnum uses Heat to orchestrate an OS image that contains a Docker container.

In this illustrative embodiment, Magnum (Heat) is therefore used to generate the plurality of containers 310 in FIG. 3. Magnum has a pod that runs a number of Docker containers, where each container runs a Cinder backup manager. This is what is illustrated in each container 310, i.e., a separate block storage backup component 312 with its own separate object storage driver 314. Magnum can alternatively use either Mesos, Kubernetes, or Swarm as part of the container orchestration engine. For each new backup request, a container is assigned to do the backup job. If all containers in the pod are being used and a new request comes in, a new container is created to handle the new request.

Thus to summarize, in an OpenStack® embodiment, a Cinder API, Cinder scheduler, and other services execute on the controller node. Cinder volume service executes on the volume node. Magnum sets up on a different node and a pod is created in Magnum with a pool of containers running backup managers (each for at least one request). Multiple backup and restore requests can be processed at the same time using backup managers running in the containers. When backup managers in all containers are in use, a new container is created to run the new backup job. In one embodiment, a container can be created for one tenant and serve the backup and restore requests for that tenant only, while a different container can be used to serve another tenant. Illustrative embodiments improve the performance of backup and restore operations and as well as provide tenant isolation. Below is a Table I summarizing illustrative descriptions of the components used in one or more illustrative OpenStack® embodiments:

TABLE I

| Component | Illustrative description |
| --- | --- |
| Cinder | Block storage as a service project in OpenStack ®. |
| Magnum | An OpenStack ® API service that makes container orchestration engine such as Docker and Kubernetes as consumable resources in OpenStack ®. |
| Heat | An OpenStack ® orchestration service. It implements an orchestration engine to launch multiple composite cloud applications based on templates. |
| Swift | An OpenStack ® project that provides object storage as a service. |
| Pod | A concept in Magnum. It is a collection of containers running on one physical or virtual machine |
| Docker | Docker containers wrap up a piece of software in a complete filesystem that contains everything it needs to run. |
| Kubernetes | Kubernetes is a system, developed by Google ®, for managing containerized applications in a clustered environment. It can be used as a container orchestration engine in Magnum. |
| Swarm | Docker Swarm is a native clustering for Docker. It allows you to create and access to a pool of Docker hosts using the full suite of Docker tools. It can be used as a container orchestration engine in Magnum. |
| Mesos | Apache Mesos abstracts CPU, memory, storage and other compute resources away from machines (physical or virtual). It can be used as a container orchestration engine in Magnum. |

Figure 4:
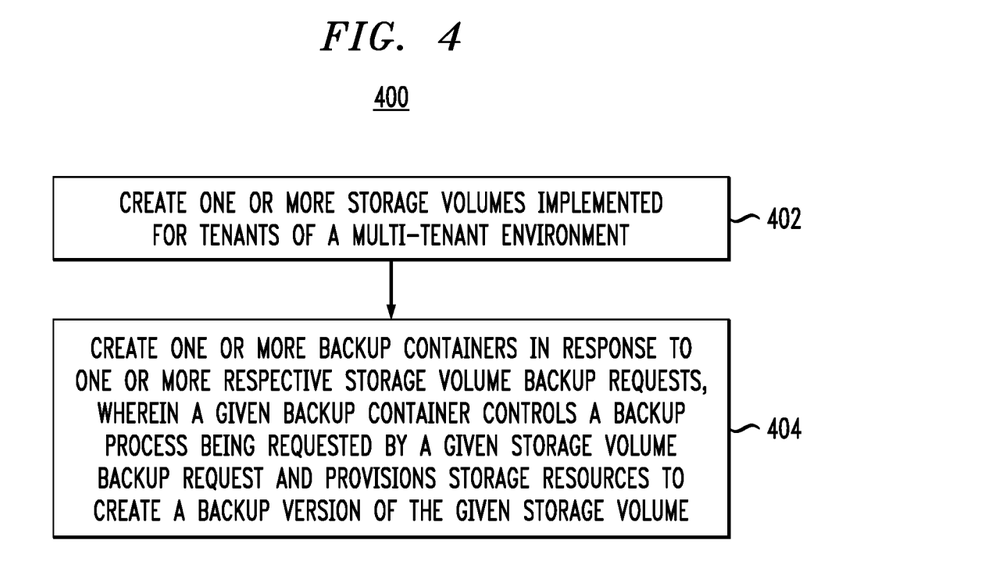
FIG. 4 shows a methodology for storage volume creation and backup in an illustrative embodiment.

FIG. 4 shows main steps of a methodology for storage volume creation and backup in an illustrative embodiment. The methodology may be implemented in environment 300 of FIG. 3, or in alternative implementations.

As shown, in the methodology 400, step 402 creates one or more storage volumes implemented for tenants of a multi-tenant environment. Step 404 creates one or more backup containers in response to one or more respective storage volume backup requests. A given backup container controls a backup process being requested by a given storage volume backup request and provisions storage resources to create a backup version of the given storage volume. The storage volume creating step is implemented on a separate node of the multi-tenant environment which is different from one or more nodes of the multi-tenant environment used to implement the one or more backup containers.

It is to be appreciated that functionality such as that described in conjunction with the diagrams of FIGS. 1 through 4 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally comprise other virtualization infrastructure such as virtual machines implemented using a hypervisor. Such cloud infrastructure can therefore be used to provide what is also referred to herein as a multi-tenant environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, multi-tenant environments, containers, storage resources, and container storage controllers that can benefit from storage intrusion detection relating to provisioned storage resources of respective tenants. Also, the particular configurations of system and device elements shown in FIGS. 1-3 and the processing operations in FIG. 4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one host device for hosting respective tenants of a multi-tenant environment;
   a storage platform coupled to the at least one host device and implementing storage resources for utilization by respective tenants; and
   a storage controller associated with the at least one host device comprising one or more nodes configured to implement storage volume creation functionality and storage volume backup functionality by provisioning portions of the storage resources, wherein the one or more nodes are implemented via at least one processing device comprising a processor operatively coupled to a memory, and, wherein:
      in implementing the storage volume creation functionality, the storage controller is configured to create at least one storage volume for one or more of the tenants; and
      in implementing the storage volume backup functionality, the storage controller is configured to create one or more backup containers for performing a storage volume backup or restore process.

2. The apparatus of claim 1, wherein the storage volume creation functionality is implemented on a separate node from the storage volume backup functionality.

3. The apparatus of claim 1, wherein each backup container comprises a block storage backup component.

4. The apparatus of claim 1, wherein each backup container comprises an object storage driver.

5. The apparatus of claim 1, wherein the storage volume backup functionality is managed in accordance with a container orchestration engine.

6. The apparatus of claim 5, wherein the container orchestration engine is implemented on the storage controller.

7. The apparatus of claim 1, wherein each of the one or more respective storage volume backup or restore processes are initiated in response to a request received by the storage controller.

8. The apparatus of claim 1, wherein the storage controller implements an open-source software platform.

9. The apparatus of claim 1 wherein the host device comprises at least one processor coupled to a memory and wherein at least a portion of the storage controller is implemented by the processor executing software stored in the memory.

10. The apparatus of claim 1 wherein the storage platform comprises at least one of a storage fabric and a storage array.

11. The apparatus of claim 1, wherein the one or more nodes of the storage controller comprise:
   a controller node configured to receive and schedule client requests;
   a volume node configured to provide the storage volume creation functionality; and
   one or more backup nodes configured to provide the storage volume backup functionality.

12. An information processing system comprising the apparatus of claim 1.

13. A method comprising:
   implementing, by one or more nodes of a storage controller associated with at least one host device for hosting respective tenants of a multi-tenant environment, at least one of storage volume creation functionality and storage volume backup functionality by provisioning portions of storage resources implemented for utilization by respective ones of the tenants;
   wherein:
      in implementing the storage volume creation functionality, the storage controller is configured to create one or more storage volumes for one or more of the tenants; and
      in implementing the storage volume backup functionality, the storage controller in configured to create one or more backup containers for performing a storage volume backup or restore process for a given storage volume implemented for the given tenant;
   wherein the one or more nodes are implemented via at least one processing device comprising a processor operatively coupled to a memory.

14. The method of claim 13, wherein the implementation of the storage volume creation functionality utilizes a block storage-based volume creation service.

15. The method of claim 13, wherein the implementation of the storage volume backup functionality utilizes a container orchestration service.

16. The method of claim 13, wherein the creation of the backup version of the given storage volume utilizes an object storage-based service.

17. A non-transitory processor-readable storage medium having stored therein program code of one or more software programs, wherein the program code, when executed by one or more processing devices of one or more nodes of a storage controller associated with at least one host device for hosting respective tenants of a multi-tenant environment, causes the one or more processing devices to:
   implement at least one of storage volume creation functionality and storage volume backup functionality by provisioning portions of storage resources implemented for utilization by respective ones of the tenants;
   wherein:
      in implementing the storage volume creation functionality, the one or more processing devices are configured to create one or more storage volumes implemented for one or more of the tenants; and
      in implementing the storage volume backup functionality, the one or more processing devices are configured to create one or more backup containers for performing a storage volume backup or restore process for a given storage volume implemented for the given tenant.

18. The processor-readable storage medium of claim 17, wherein the implementation of the storage volume creation functionality utilizes a block storage-based volume creation service.

19. The processor-readable storage medium of claim 17, wherein the implementation of the storage volume backup functionality utilizes a container orchestration service.

20. The processor-readable storage medium of claim 17, wherein the creation of the backup version of the given storage volume utilizes an object storage-based service.

* * * * *